United States Patent
Park

(10) Patent No.: US 7,911,718 B2
(45) Date of Patent: Mar. 22, 2011

(54) LENS TRANSFER DEVICE AND CAMERA MODULE HAVING THE SAME

(75) Inventor: Chuel Jin Park, Gwangmyeong-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 8 days.

(21) Appl. No.: 12/292,117

(22) Filed: Nov. 12, 2008

(65) Prior Publication Data

US 2009/0290243 A1    Nov. 26, 2009

(30) Foreign Application Priority Data

May 21, 2008    (KR) .......................... 10-2008-0046975

(51) Int. Cl.
    *G02B 7/02*    (2006.01)
(52) U.S. Cl. ........................................ 359/819; 359/822

(58) Field of Classification Search ................. 359/819, 359/822, 824, 813, 814, 823
    See application file for complete search history.

(56) References Cited

U.S. PATENT DOCUMENTS

| 7,518,812 B2 * | 4/2009 | Sue et al. ...................... 359/824 |
| 7,656,596 B2 * | 2/2010 | Matsumoto .................... 359/826 |
| 2002/0049366 A1 * | 4/2002 | Kehr ............................. 600/172 |

FOREIGN PATENT DOCUMENTS

| JP | 2004-162703 |   | 6/2004 |
| JP | 2007-108533 | * | 4/2007 |

* cited by examiner

*Primary Examiner* — Timothy J Thompson

(57) ABSTRACT

Provided is a lens transfer device including a housing; a coil that is installed on the circumference of the housing; a lens barrel that is installed inside the housing and has a lens group embedded therein; and an actuator that is installed in one side of a direction where the lens barrel is linearly transferred, and of which the shape is recovered by a magnetic field generated through the coil so as to linearly transfer the lens barrel.

11 Claims, 4 Drawing Sheets

[FIG. 1]
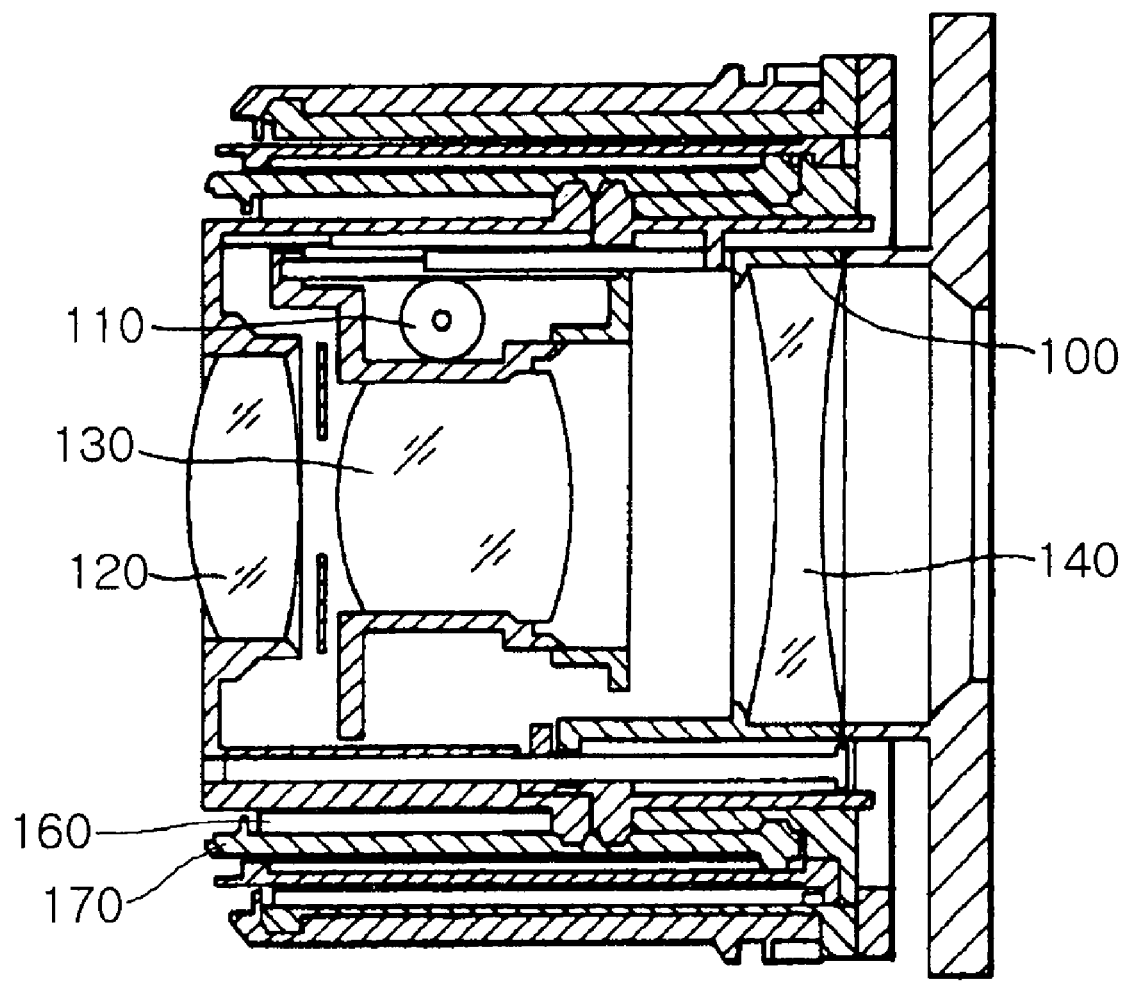
- Prior Art

[FIG. 2]
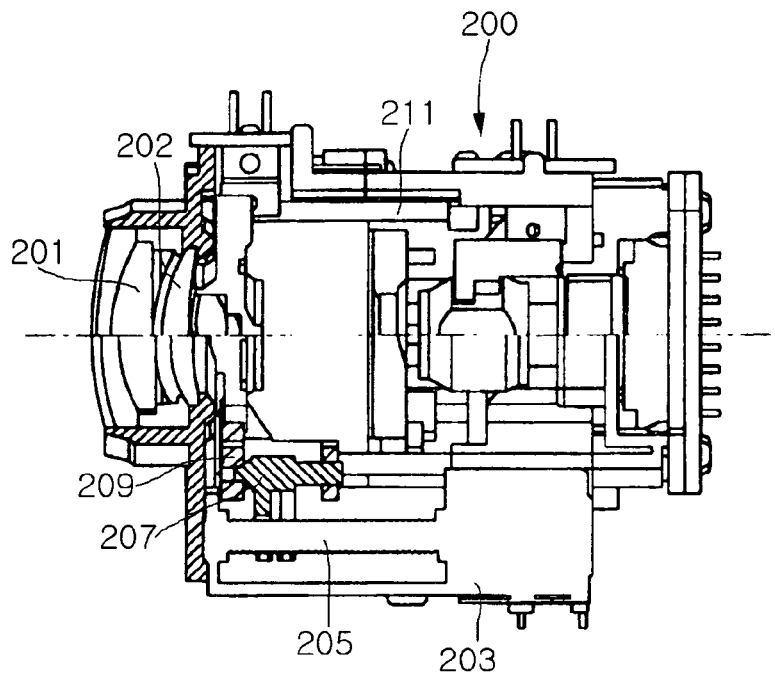
- Prior Art
[FIG. 3]
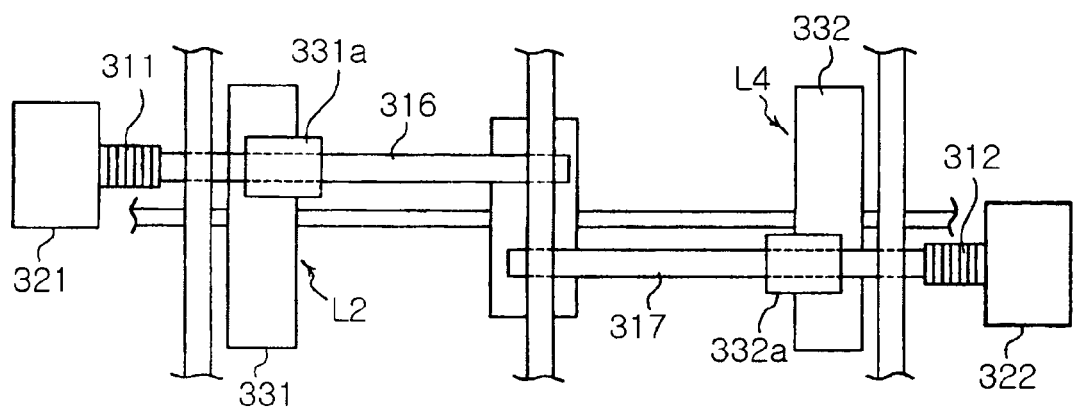
- Prior Art

[FIG. 4]
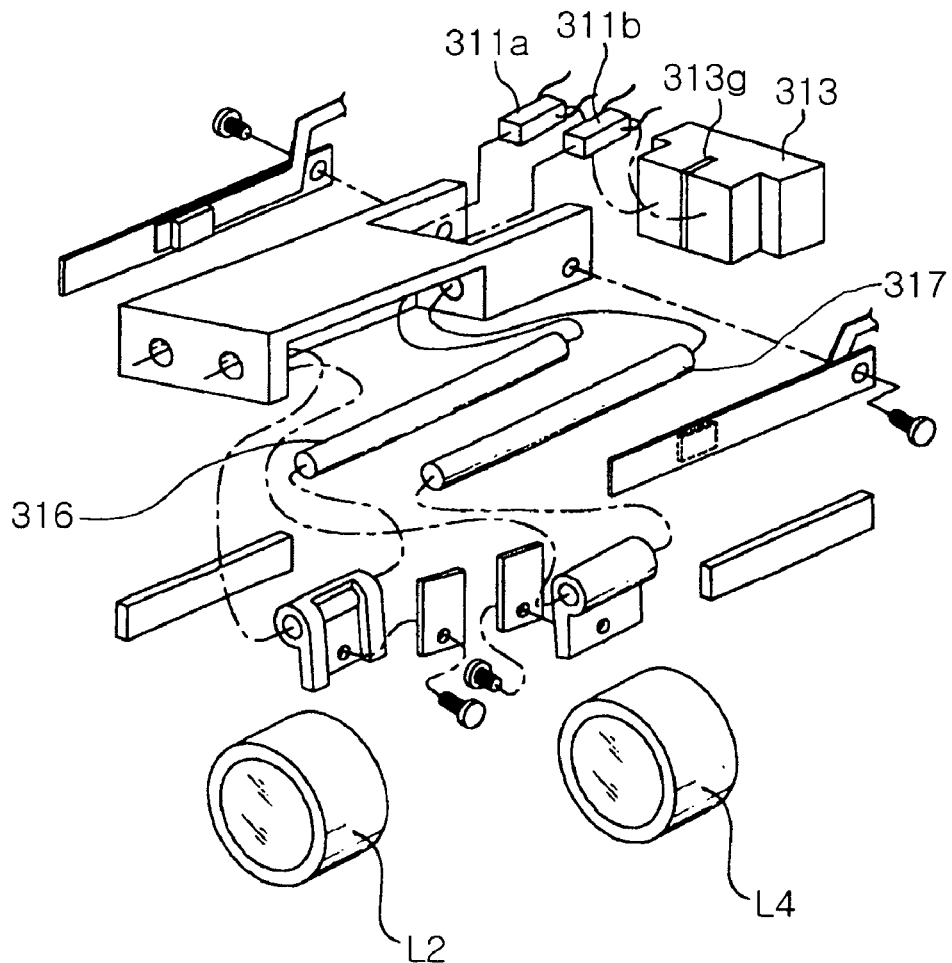
- Prior Art
[FIG. 5]
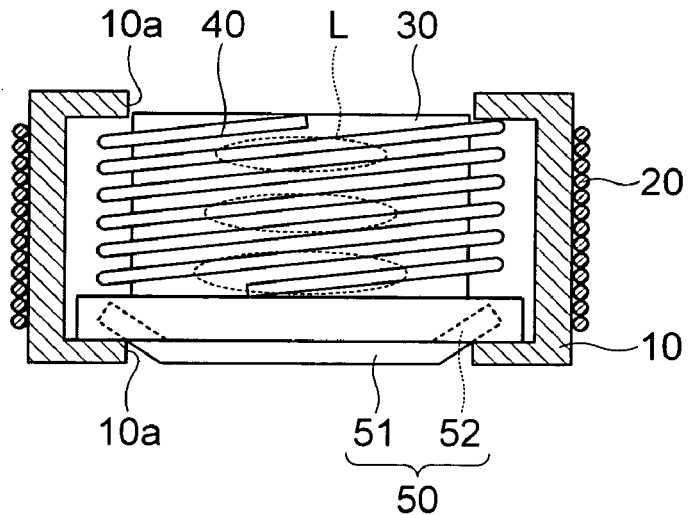

[FIG. 6]
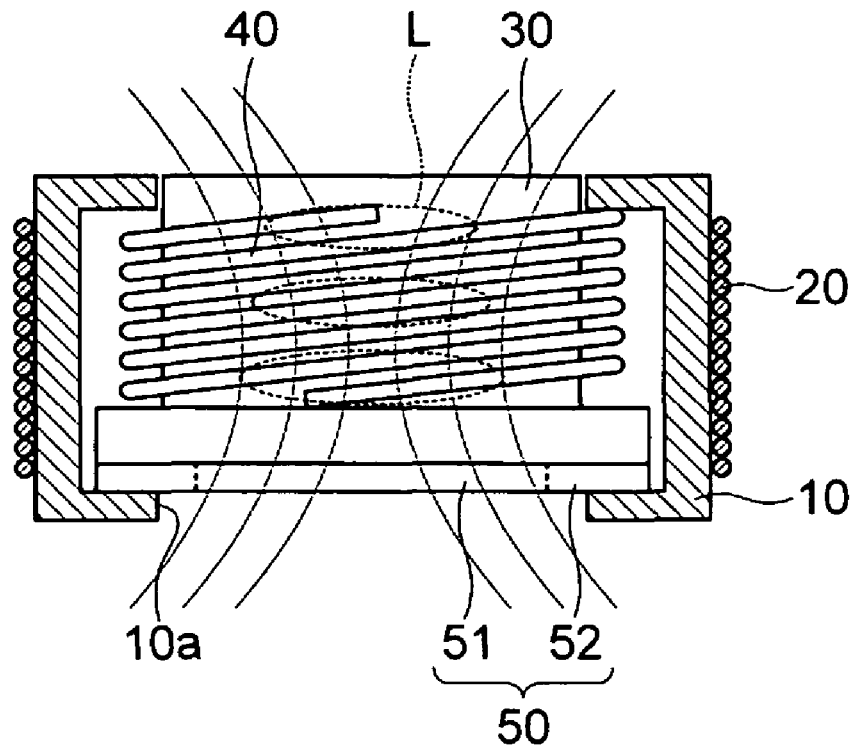
[FIG. 7]
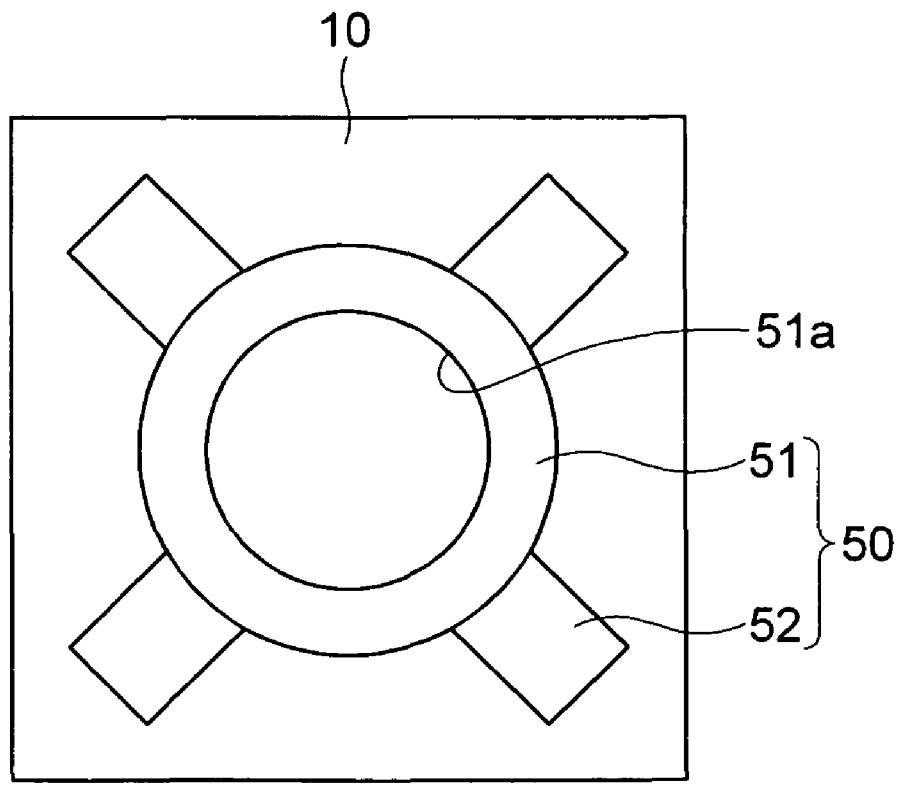

LENS TRANSFER DEVICE AND CAMERA MODULE HAVING THE SAME

CROSS-REFERENCE TO RELATED APPLICATIONS

This application claims the benefit of Korean Patent Application No. 10-2008-0046975 filed with the Korea Intellectual Property Office on May 21, 2008, the disclosure of which is incorporated herein by reference.

BACKGROUND OF THE INVENTION

1. Field of the Invention

The present invention relates to a lens transfer device and a camera module having the same.

2. Description of the Related Art

Recently, portable terminals such as mobile phones and personal digital assistants (PDA) having a camera embedded therein are launched, and consumers also request terminals having a camera embedded therein, the camera having a variety of functions. Such a camera embedded in mobile terminals is constructed by attaching a lens to an imaging element such as charge coupled device (CCD) or complementary metal oxide semiconductor (CMOS) image sensors, and photographs an object and stores the image data of the object in a predetermined recording medium.

With the recent development of mobile terminals such as portable phones and PDAs, the mobile terminals provide a phone call function and are used as multi-convergence devices. The most representative of the multi-convergence devices is a camera module. The resolution of the camera module changes from 300,000 pixels (VGA) to 7,000,000 pixels. Moreover, the camera module provides various additional functions, such as auto-focusing (AF) and optical zoom.

In particular, demand for mobile terminals having a camera module with an autofocusing (AF) function is rapidly increasing, because a high-quality image in which focusing is achieved can be provided, regardless of a focal distance from an object. However, as a variety of functions including the AF function are implemented, the number of components embedded in the camera module increases. Therefore, the entire size of the camera module inevitably increases, compared with the size of a general camera module.

Therefore, when the camera module is mounted on a mobile terminal, there are difficulties in performing an assembling process because of lack of a mounting space for the camera module.

Further, since an automatic or manual driving method is applied depending on a driving method and a camera embedded in a mobile phone should be manufactured with a small size, a macro function for photographing a close object at an accurate focus is implemented by focus adjustment using a minute position change of a lens.

Since the macro function by the manual driving method can be implemented by a relatively cheap and simple structure in comparison with the automatic driving method, the manual driving method is mainly applied to a camera for mobile phones. The focus adjustment of the lens is performed by a structure which directly drives the lens through a lever projecting outward from the lens.

Conventionally, to perform the AF function and the macro function, a cam driving method has been mainly used. In the cam driving method, as the relative distance between lenses is changed along a cam-shaped groove positioned on a side surface of a lens barrel which is driven by an electromagnetic motor, the respective lenses are vertically driven.

FIG. 1 is a diagram showing the structure of a conventional lens driving device disclosed in U.S. Pat. No. 6,268,970. The conventional lens driving device includes frames supporting lens groups 120, 130, and 140 and cam tubes 160 and 170 supporting the frames. The respective cam tubes support the frames such that the frames can relatively move in the direction of the optical axis of an optical system, and are driven by an actuator 110.

In such a lens driving device, the relative positions of the respective lenses are determined by the shape of a cam. Therefore, a focus lens and a focus adjusting mechanism for adjusting a focus at a specific magnification are additionally required, and a driving mechanism such as a lens holding mechanism, which moves along a final reduction gear and the cam, becomes complex.

FIG. 2 is a diagram showing another conventional lens driving device disclosed in Korean Patent Laid-open Publication No. 2000-55180. The conventional lens driving device includes a fixed lens group 201 coupled to a camera body 200, the fixed lens group 201 including a plurality of lenses. The camera body 200 has a housing space formed therein, and a zoom motor 203 is housed in the housing space. The zoom motor 203 has a shaft coupled to a guide screw 205, and the guide screw 205 has a screw thread and a screw groove formed on the outer circumference thereof. Further, a clip 207 for transmitting power is coupled to the outer circumference of the guide screw 205. The clip 207 has a screw thread and a screw groove formed thereon. The screw thread and the screw groove of the clip 207 have the same shape as the screw thread and the screw groove of the guide screw 205 such that one side of the clip 207 contacted with the guide screw 205 is coupled to the screw thread and the screw groove of the guide screw 205. One side of the clip 207 is coupled to a zoom barrel 209. The zoom barrel 209 is coupled to a moving lens group 202. The zoom lens barrel 209 is coupled to a guide shaft 211 disposed in an optical-axis direction so as to move along the guide shaft in the optical-axis direction.

In the zoom lens mechanism constructed in such a manner, when the zoom motor 203 rotates, the guide screw 205 is rotated. Then, the torque of the guide screw 205 is converted into a straight-line motion by the clip 207. Therefore, the clip 207 moves straight in the optical-axis direction. As the clip 207 moves straight, the zoom barrel 209 moves along the optical-axis direction. When the zoom barrel 209 moves along the optical-axis direction, a portion of the zoom barrel 209 coming in contact with the guide shaft 211 is slid in such a manner that the zoom barrel 209 can reciprocate in the optical-axis direction.

In the zoom lens mechanism constructed in such a manner, since an electromagnetic motor is used, electromagnetic waves may occur. Therefore, the application of the zoom lens mechanism into small-sized communication devices is limited. Further, since the electromagnetic motor is used, a final reduction gear is used, so that the mechanical structure of the zoom lens mechanism becomes complex. Further, in order to adjust a focus, the zoom lens and the focus lens should be moved independently from each other.

Recently, an ultra-small optical zoom lens mechanism has been developed so as to be applied to a small optical system having a zoom function. In such an ultra-small optical zoom lens mechanism, an electromagnetic motor is not used, but an intellectual element such as a piezoelectric element is mainly used. As the electromagnetic motor is substituted with the piezoelectric element, a driving mechanism for driving a lens can be simplified, which makes it possible to achieve high efficiency.

FIGS. 3 and 4 are diagrams showing a further conventional lens driving device using such a piezoelectric element, disclosed in U.S. Pat. No. 6,215,605. In the conventional lens driving device, piezoelectric actuators 311a and 311b are fixed to base blocks 321 and 322, respectively, and their expansion and contraction are transmitted to driving rods 316 and 317. Then, lenses L2 and L4 are transferred by pre-pressure generated from sliding portions 331a and 332a and an inertia force of lens holders 331 and 332. As the lens holders are transferred or slide with the driving rods in accordance with the waveform of the pressure of the piezoelectric actuators 311a and 311b, the lenses L2 and L4 can be transferred in both directions.

When the displacement of one piezoelectric actuator between adjacent piezoelectric actuators 311a and 311b is transmitted through the base block 313, the displacement may be transmitted to another lens. Therefore, the base block 313 has a groove 313g formed therein so as to prevent the transmission of displacement between the piezoelectric actuators. As the groove is formed, the structure of the lens driving device becomes complex. Further, the displacement interference between the piezoelectric actuators cannot be perfectly removed.

Further, the length of the driving rods 316 and 317, which are moved by the piezoelectric actuators so as to transfer the lenses, is limited depending on the size of the piezoelectric actuators. The limitation of the length of the driving rods causes the limitation of lens transfer distance, thereby having an effect upon product performance.

In this case, since the driving rods are fixed, the length of a barrel having lenses built therein cannot be changed. In addition to a space for the transfer distance of the lenses, a separate space in which other components are arranged is necessary, which makes it difficult to reduce the size of the device. Further, since only one ends of the lenses are supported by the driving rods, asymmetrical displacement occurs in the lenses such that the lenses are likely to be unstably driven.

SUMMARY OF THE INVENTION

An advantage of the present invention is that it provides a lens transfer device, which linearly a lens barrel through an actuator formed of a magnetic shape memory alloy (MSMA) such that the structure of the lens transfer device is simplified. Therefore, it is possible to reduce the size of a camera module.

Another advantage of the invention is that it provides a camera module having a lens transfer device.

Additional aspect and advantages of the present general inventive concept will be set forth in part in the description which follows and, in part, will be obvious from the description, or may be learned by practice of the general inventive concept.

According to an aspect of the invention, a lens transfer device comprises a housing; a coil that is installed on the circumference of the housing; a lens barrel that is installed inside the housing and has a lens group embedded therein; and an actuator that is installed in one side of a direction where the lens barrel is linearly transferred, and of which the shape is recovered by a magnetic field generated through the coil so as to linearly transfer the lens barrel.

The actuator is formed of MSMA.

The actuator may include a barrel support portion having a through-hole through which light incident through the lens group of the lens barrel passes; and a plurality of deformable portions which are bent from the lens barrel support portion so as to radially extend.

The barrel support portion may be formed in a shape corresponding to the bottom surface of the lens barrel, and the plurality of deformable portions may radially extend from the barrel support portion toward the internal empty space of the housing.

According to another aspect of the invention, a lens transfer device comprises a housing; a coil that is installed on the circumference the housing; a lens barrel that is installed inside the housing and has a lens group embedded therein; a preload member that elastically pressurizes and supports the lens barrel; and an actuator that is installed in one side of a direction where the lens barrel is linearly transferred, and of which the shape is recovered by a magnetic field generated through the coil so as to linearly transfer the lens barrel.

The preload member may be installed so as to surround the outer surface of the lens barrel within the housing, and may be formed of an elastic spring which pressurizes the lens barrel toward the actuator.

The actuator may be formed of MSMA.

The actuator may include a barrel support portion having a through-hole through which light incident through the lens group of the lens barrel passes; and a plurality of deformable portions which are bent from the lens barrel support portion so as to radially extend.

According to a further aspect of the invention, there is provided a method of driving a lens barrel transfer device, the lens barrel transfer device including: a housing; a coil that is installed on the circumference of the housing; a lens barrel that is installed inside the housing and has a lens group embedded therein; a preload member that elastically pressurizes and supports the lens barrel; and an actuator that is installed in one side of a direction where the lens barrel is linearly transferred, and of which the shape is recovered by a magnetic field generated through the coil so as to linearly transfer the lens barrel. The method comprises pressurizing the lens barrel through the preload member such that the actuator is maintained in a deformed state; and applying a current to the coil so as to generate a magnetic field such that the shape of the actuator is recovered to transfer the lens barrel.

The transfer speed of the actuator may be adjusted by the intensity of the magnetic field, which varies depending on a change in the intensity of the current applied to the coil.

The actuator may be formed of MSMA.

The preload member may be installed so as to surround the outer surface of the lens barrel within the housing, and may be formed of an elastic spring which pressurizes the lens barrel toward the actuator.

According to a still further aspect of the invention, a camera module comprises a lens transfer device including: a housing; a coil that is installed on the circumference of the housing; a lens barrel that is installed inside the housing and has a lens group embedded therein; and an actuator that is installed in one side of a direction where the lens barrel is linearly transferred, and of which the shape is recovered by a magnetic field generated through the coil so as to linearly transfer the lens barrel; and an image sensor module that is provided under the lens transfer device and has an image sensor module mounted therein, the image sensor converting light, which is incident through the lens group of the lens barrel, into an electrical signal.

The lens transfer device may further include a preload member which is installed inside the housing so as to elastically pressurize and support the lens barrel.

The actuator may be formed of MSMA.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a diagram showing the structure of a conventional lens driving device;

FIG. 2 is a diagram showing another conventional lens driving device;

FIGS. 3 and 4 are diagrams showing a further conventional lens driving device;

FIG. 5 is a cross-sectional view of a lens transfer device according to an embodiment of the invention, showing a state where power is not applied;

FIG. 6 is a cross-sectional view of the lens transfer device according to the embodiment of the invention, showing a state where power is applied; and FIG. 7 is a plan view of an actuator of the lens transfer device according to the embodiment of the invention, showing a state where the actuator is installed.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a lens transfer device and a camera module having the same according to the present invention will be described in detail with reference to the accompanying drawings.

FIG. 5 is a cross-sectional view of a lens transfer device according to an embodiment of the invention, showing a state where power is not applied. FIG. 6 is a cross-sectional view of the lens transfer device according to the embodiment of the invention, showing a state where power is applied. FIG. 7 is a plan view of an actuator of the lens transfer device according to the embodiment of the invention, showing a state where the actuator is installed.

As shown in FIGS. 5 and 6, the lens transfer device according to the embodiment of the invention includes a housing 10 which has openings 10a formed on the upper and lower surfaces thereof such that the upper and lower surfaces are opened, a coil 20 which is installed on the circumference of the housing 10, a lens barrel 30 which is installed inside the housing 10 and has a lens group having at least one or more lenses L stacked therein, a preload member 40 which elastically pressurizes and supports the lens barrel 30, and an actuator 50 which linearly transfers the lens barrel 30 and is installed at one side in the transfer direction of the lens barrel 30.

Preferably, the actuator 50 is formed of a magnetic shape memory alloy (MSMA).

The MSMA is a kind of SMA, and the shape of the MSMA is recovered by a magnetic field generated therearound, while the shape of general SMA is recovered by heat generated when power is applied.

In the general SMA, since the shape of the SMA is recovered by heat, an expected operation error may occur due to heat applied from outside except for the heat generated by the applied power. In the MSMA, however, since the shape of the MSMA is recovered by a magnetic field, it is possible to prevent an operation error from occurring, if the magnetic field generated by a current applied to the coil 20 can be adjusted.

Further, since the phase transformation of metal caused by heat is used in the general SMA, the response speed thereof is slow. However, since the shape of the MSMA is recovered by the magnetic field, the response speed thereof is so high that the speed of the entire system, that is, the transfer speed of the lens barrel can be increased.

The preload member 40, which is installed inside the housing 10 so as to surround the outer surface of the lens barrel 30, may be formed of an elastic spring which pressurizes the lens barrel 30 toward the actuator 50.

The actuator 50 includes a barrel support portion 51 having a through-hole 51a, through which light incident through the lens group of the lens barrel 30 passes, and a plurality of deformable portions 52 which are bent from the barrel support portion 51 so as to radially extend.

Referring to FIG. 7, the barrel support portion 51 is formed in a shape corresponding to the bottom surface of the lens barrel 30, and the plurality of deformable portions 52 may be formed so as to radially extend from the barrel support portion 51 toward the internal empty space of the housing 10.

That is, as shown in FIG. 5, the lens barrel 30 is pressurized toward the bottom surface of the housing 10 by the preload member 40 in a state where a current is not applied to the coil 20. As the lens barrel 30 is pressurized, the plurality of deformable portions 52 of the actuator 50 are bent from the barrel support portion 51 so as to be inserted into the lower end of the lens barrel 30, and the barrel support portion 51 of the actuator 50 is inserted into the opening 10a formed on the lower surface of the housing 10.

In this case, when a current is applied to the coil 20 as shown in FIG. 6, a magnetic field is formed. Then, while the shape of the actuator 50 is recovered by the magnetic field, the plurality of deformable portions 52, which have been upward bent from the barrel support portion 51 of the actuator 50, are straightened so as to transfer the lens barrel 30 upward.

At this time, the preload member 40 is constructed in such a manner that the elastic force which pressurizes the lens barrel 30 is set to be smaller than the shape recovery force of the actuator 50.

Next, a method of driving the lens transfer device according to an embodiment of the invention will be described.

The method of driving the lens transfer device includes a pressing step in which the lens barrel 30 is pressurized by the preload member 40 such that the actuator 50 is maintained in a deformed state, as shown in FIG. 5, and a transfer step in which as a current is applied to the coil 20 so as to generate a magnetic field, the shape of the actuator 50 is recovered so as to transfer the lens barrel 30.

The transfer speed of the actuator 50 may be adjusted by the intensity of the magnetic field, which varies depending on a change in the intensity of the current applied to the coil 20.

More specifically, as shown in FIG. 5, the pressing step is a state where a current is not applied to the coil 20. In this state, the lens barrel 30 is pressurized toward the bottom surface of the housing 10 by the preload member 40. Further, as the lens barrel 30 is pressurized, the plurality of deformable portions 52 of the actuator 50 are bent from the barrel support portion 51 so as to be inserted into the lower end of the lens barrel 30, and the barrel support portion 51 of the actuator 50 is inserted into the opening 10a formed in the bottom surface of the housing 10.

That is, when a current is not applied to the coil 20, a magnetic field is not formed. Therefore, the actuator 50 is deformed by the pressing force of the preload member 40 so as to be set in the initial state where the lens barrel 30 does not perform a zoom or autofocusing function.

Then, as shown in FIG. 6, the transfer step is a state where a current is applied to the coil 20. As such, when a current is applied to the coil 20, a magnetic field is formed. Then, while the shape of the actuator 50 is recovered by the magnetic field, the lens barrel 30 is transferred upward.

That is, the plurality of deformable portions 50, which have been bent upward from the barrel support portion 50, are straightened in response to the magnetic field formed when a current is applied to the coil 20. Then, while the barrel support portion 51 is moved upward, the lens barrel 30 is transferred upward against the pressing force of the preload member 40. In this way, the zoom or autofocusing function is implemented.

Meanwhile, when the lens transfer device is applied to a camera module, an image sensor module may be installed under the lens transfer device.

Further, the image sensor module is provided under the lens transfer device, the image sensor module including an image sensor mounted therein. The image sensor converts light, which is incident through the lens group embedded in the lens barrel 30 of the lens transfer device, into an electrical signal.

In other words, as the lens barrel 30 is vertically transferred by the lens transfer device, the zoom or autofocusing function of the camera module is implemented, while the distance between the lens group embedded in the lens barrel 30 and the image sensor of the image sensor module is adjusted.

According to the present invention, the structure of the lens transfer device can be simplified, which makes it possible to reduce the size of a camera module having the lens transfer device and to minimize a power loss.

Further, since a mechanical driving gear is not used, it possible to prevent noise from occurring and to minimize a power loss caused by mechanical control.

Furthermore, since the actuator is formed of MSMA, an unexpected operation error caused by external heat can be prevented from occurring, and a reduction in response speed caused by the deformation due to the heat can be prevented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A lens transfer device comprising:
   a housing;
   a coil that is installed on the circumference of the housing;
   a lens barrel that is installed inside the housing and has a lens group embedded therein; and
   an actuator formed of magnetic shape memory alloy (MSMA) that is installed in one side of a direction where the lens barrel is linearly transferred, and of which the shape is recovered by a magnetic field generated through the coil so as to linearly transfer the lens barrel.

2. The lens transfer device according to claim 1, wherein the actuator includes:
   a barrel support portion having a through-hole through which light incident through the lens group of the lens barrel passes; and
   a plurality of deformable portions which are bent from the lens barrel support portion so as to radially extend.

3. The lens transfer device according to claim 2, wherein the barrel support portion is formed in a shape corresponding to the bottom surface of the lens barrel, and the plurality of deformable portions radially extend from the barrel support portion toward the internal empty space of the housing.

4. A lens transfer device comprising:
   a housing;
   a coil that is installed on the circumference the housing;
   a lens barrel that is installed inside the housing and has a lens group embedded therein;
   a preload member that elastically pressurizes and supports the lens barrel; and
   an actuator that is formed of magnetic shape memory alloy (MSMA) that is installed in one side of a direction where the lens barrel is linearly transferred, and of which the shape is recovered by a magnetic field generated through the coil so as to linearly transfer the lens barrel.

5. The lens transfer device according to claim 4, wherein the preload member is installed so as to surround the outer surface of the lens barrel within the housing, and is formed of an elastic spring which pressurizes the lens barrel toward the actuator.

6. The lens transfer device according to claim 4, wherein the actuator includes:
   a barrel support portion having a through-hole through which light incident through the lens group of the lens barrel passes; and
   a plurality of deformable portions which are bent from the lens barrel support portion so as to radially extend.

7. A method of driving a lens barrel transfer device, the lens barrel transfer device including: a housing; a coil that is installed on the circumference of the housing; a lens barrel that is installed inside the housing and has a lens group embedded therein; a preload member that elastically pressurizes and supports the lens barrel; and an actuator that is formed of magnetic shape memory alloy (MSMA) that is installed in one side of a direction where the lens barrel is linearly transferred, and of which the shape is recovered by a magnetic field generated through the coil so as to linearly transfer the lens barrel, the method comprising:
   pressurizing the lens barrel through the preload member such that the actuator is maintained in a deformed state; and
   applying a current to the coil so as to generate a magnetic field such that the shape of the actuator is recovered to transfer the lens barrel.

8. The method according to claim 7, wherein the transfer speed of the actuator is adjusted by the intensity of the magnetic field, which varies depending on a change in the intensity of the current applied to the coil.

9. The method according to claim 7, wherein the preload member is installed so as to surround the outer surface of the lens barrel within the housing, and is formed of an elastic spring which pressurizes the lens barrel toward the actuator.

10. A camera module comprising:
    a lens transfer device including:
       a housing;
       a coil that is installed on the circumference of the housing;
       a lens barrel that is installed inside the housing and has a lens group embedded therein; and
       an actuator that is formed of magnetic shape memory alloy (MSMA) that is installed in one side of a direction where the lens barrel is linearly transferred, and of which the shape is recovered by a magnetic field generated through the coil so as to linearly transfer the lens barrel; and
    an image sensor module that is provided under the lens transfer device and has an image sensor module mounted therein, the image sensor converting light, which is incident through the lens group of the lens barrel, into an electrical signal.

11. The camera module according to claim 10, wherein the lens transfer device further includes a preload member which is installed inside the housing so as to elastically pressurize and support the lens barrel.

* * * * *